United States Patent [19]

Daniels

[11] 4,316,659
[45] Feb. 23, 1982

[54] INFRARED FILTER EXPOSURE COMPENSATION APPARATUS

[75] Inventor: Steven D. Daniels, Byron, N.Y.

[73] Assignee: Eastman Kodak Company, Rochester, N.Y.

[21] Appl. No.: 199,150

[22] Filed: Oct. 22, 1980

Related U.S. Application Data

[63] Continuation of Ser. No. 80,375, Oct. 1, 1979, abandoned.

[51] Int. Cl.³ .................. G03B 7/087; G03B 15/03
[52] U.S. Cl. .................................. 354/42; 354/49; 354/59; 354/126
[58] Field of Search .................. 354/27, 32–34, 354/42, 49, 59, 60 F, 126, 128, 139, 149, 195, 29; 356/225

[56] References Cited

U.S. PATENT DOCUMENTS

| | | | |
|---|---|---|---|
| 3,205,802 | 9/1965 | Wareham | 354/60 F X |
| 3,455,218 | 7/1969 | Eagle et al. | 354/27 |
| 4,003,062 | 1/1977 | Galbraith, Jr. | 354/59 X |
| 4,040,070 | 8/1977 | Hochreiter et al. | 354/49 X |
| 4,059,836 | 11/1977 | Hochreiter et al. | 354/29 |

Primary Examiner—L. T. Hix
Assistant Examiner—W. J. Brady
Attorney, Agent, or Firm—D. P. Monteith

[57] ABSTRACT

A camera includes (1) a socket for detachably receiving a flashbulb, (2) a flash sensing member for detecting the presence and absence of a flashbulb in the socket, (3) a diaphragm for adjusting an exposure aperture as a function of whether the ambient light is bright or dim, and (4) a photosensor, responsive to visible light and infrared (IR), for controlling an exposure in accordance with the total visible light and IR passing along a light path to energize the photosensor during an exposure interval. An IR-attenuating filter is mounted for movement between a normal first position in alignment with the light path for effectively blocking IR from impinging upon the photosensor, and an actuated second position outside the light path to enable IR to energize the photosensor. A filter moving member, controlled jointly by the diaphragm and the flash sensing member, enables the filter to be moved out of the photosensor's light path when a scene is to be photographed with flash light and the diaphragm is adjusted for an exposure in dim light, whereby IR influences the control of a flash exposure only when the exposure aperture size is adjusted for dim light.

5 Claims, 7 Drawing Figures

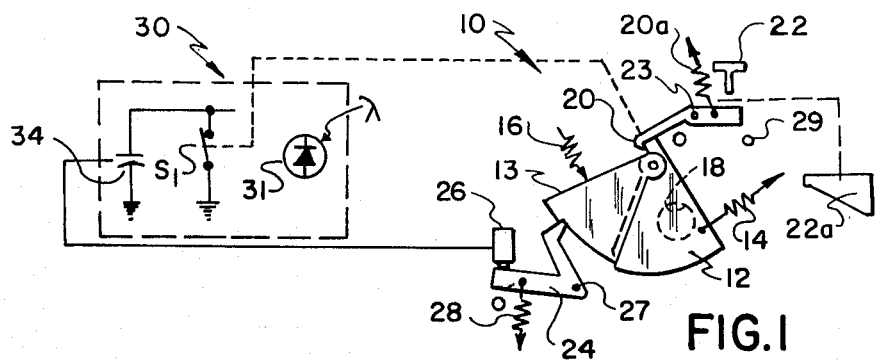
FIG.1
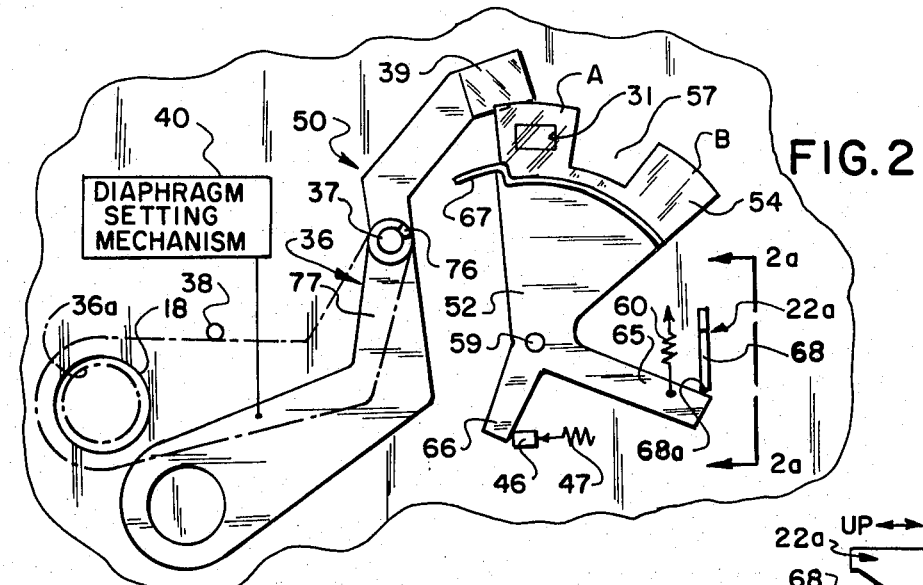
FIG.2
FIG.2a
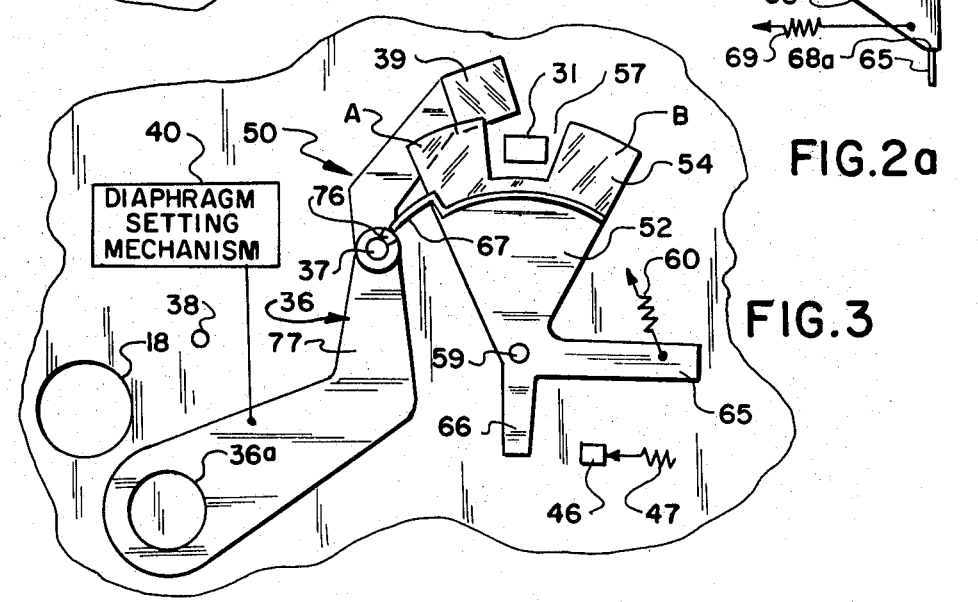
FIG.3

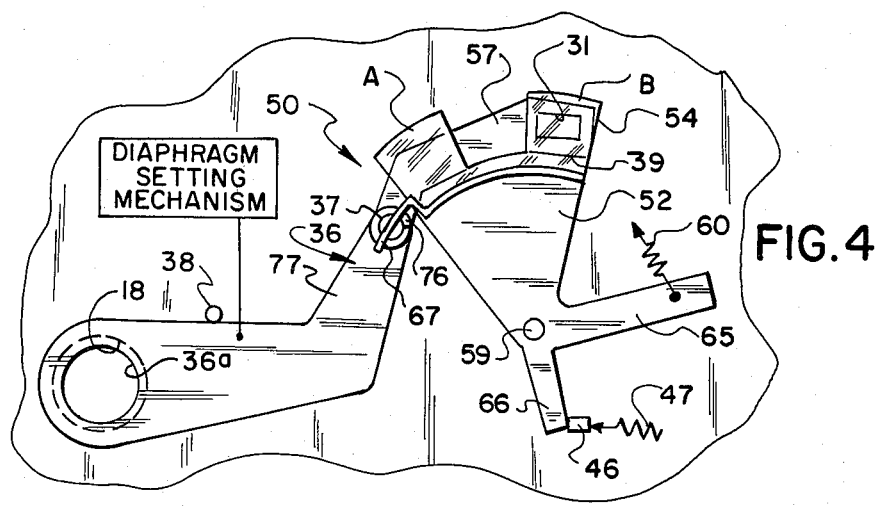
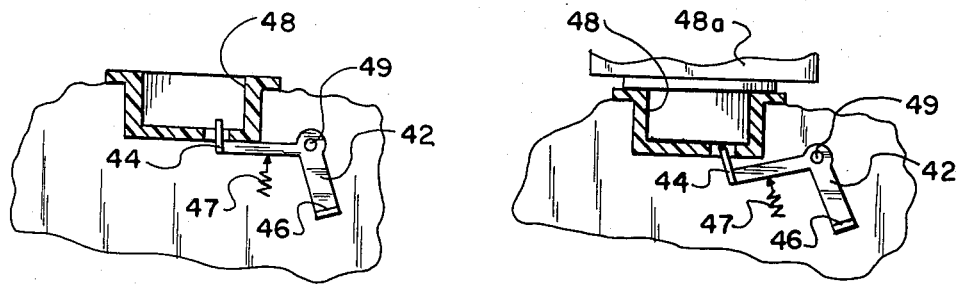

INFRARED FILTER EXPOSURE COMPENSATION APPARATUS

This is a continuation of application Ser. No. 080,375, filed Oct. 1, 1979, now abandoned.

CROSS-REFERENCE TO A RELATED APPLICATION

Reference is hereby made to U.S. patent application Ser. No. 080,374 entitled "Partial Infrared Filter Exposure Compensation Apparatus" by R. Bloom, filed on Oct. 1, 1979.

BACKGROUND OF THE INVENTION

1. Field of the Invention

This invention relates to a camera having a photosensor for controlling a photographic exposure, and, more particularly, to an infrared (IR) filter control mechanism for regulating IR impinging upon the photosensor to refine the control of an indoor flash exposure.

2. Description of the Prior Art

Cameras having a photosensor for regulating an exposure are well known in the photographic art. The photosensor produces a current that is related to light impinging upon it. When a camera shutter is open, the current charges a capacitor. When the capacitor is charged to a predetermined voltage representing a desired exposure, an exposure terminating signal is produced. In the case of a chemical flash exposure, an electromagnet, responsive to the terminating signal, is actuated to close the shutter. In the case of an electronic strobe flash exposure, a circuit is energized to quench the electronic strobe flash.

Grass and green foliage reflect relatively high amounts of IR. To prevent a photosensor that is sensitive both to IR and to visible light from prematurely charging the capacitor and closing the shutter in outdoor photography, it is known to use a filter to block IR from the photosensor. U.S. Pat. No. 4,040,070, which is assigned to the assignee of the present invention, describes such an arrangement.

A photographer may choose to use flash illumination when taking pictures outdoors. The flash illumination provides what is commonly known as "fill-flash" to soften dark shadows, which occur in bright sunlight.

In the exposure control apparatus described in U.S. Pat. No. 4,040,070, a flash-sensing member moves the filter from its IR-blocking position whenever a flash exposure is to be taken, which normally occurs indoors. Therefore, an outdoor flash picture can be underexposed because IR from foliage can impinge upon the photosensor and cause the shutter to close prematurely.

SUMMARY OF THE INVENTION

Both flashbulbs and electronic strobe flash devices emit IR and visible light. When a flash exposure is made indoors of a subject wearing dark clothing, the subject reflects relatively little visible light. A photosensor produces only a small current in response to the reflected visible light. With respect to light areas of the subject such as light facial tones, an exposure terminating signal is delayed if only visible light reaches the photosensor, thereby causing an overexposure of these light areas.

Clothing, regardless of color, tends to be more reflective of IR, and tends to reflect IR more uniformly than visible light. When IR, in addition to visible light, is allowed to impinge upon a photosensor, which is sensitive to both IR and visible light, a larger output current is produced.

For an indoor flash exposure of a generally dark scene, this larger current causes the exposure terminating signal to be advanced so that any light scene areas, such as light flesh tones, are not overexposed. On the other hand, for an indoor flash exposure of a generally light scene, the reflected visible light dominates the IR and the exposure terminating signal occurs at the proper time regardless of whether or not IR reaches the photosensor.

The use of IR to improve flesh tones of subjects exposed indoors with flash light may mean some reduction in the quality of the reproduction of subject background and clothing. However, the beneficial effect on the reproduction of light areas, particularly light flesh tones, outweighs any reduction in the reproduction quality of other scene portions.

With outdoor scenes having grass and green foliage, the ambient IR is intense and can cause an underexposure, regardless of whether or not fill-flash light is used. Therefore, a conflict exists between the relative desirability of having IR impinge upon the photosensor for an indoor flash exposure of a generally dark scene, and the relative undesirability of IR reaching the photosensor for an outdoor exposure, whether or not flash light is used.

In accordance with the teachings of this invention, a mechanism selectively regulates IR impinging upon an IR-sensitive photosensor to refine the control of an indoor flash exposure. The mechanism positions an IR-attenuating filter into and out of a light path to the photosensor as a function of (1) the presence or absence of a source of flash illumination, and (2) the size of an adjustable exposure aperture. More specifically, if the flash source is used, and if the exposure aperture is large, most probably indicating that an indoor flash picture will be taken, the mechanism positions the filter out of the light path to the photosensor, thereby permitting IR to impinge upon the photosensor and impart its beneficial effect on the flash picture. If the flash source is used and if the exposure aperture is small, most probably indicating that an outdoor fill-flash picture will be taken, the mechanism positions the filter in the light path to the photsensor to effectively block IR from it. For a fill-flash exposure this is desirable because the flash illumination is merely supplementary and IR falling upon the photosensor is to be avoided for the same reason as when photographing outdoor scenes without fill-flash. Finally, if an exposure only with ambient light is to be made, the filter effectively blocks IR from the photosensor whether or not the exposure aperture is small or large. This is because exposures made solely with ambient illumination normally occur outdoors, and detrimentally intense IR, which can cause an underexposure, can occur both in bright light, when the small aperture is used, or in dim light, when the large aperture is used.

The invention, and its advantages, will become more apparent in the detailed description of a preferred embodiment presented below.

DESCRIPTION OF THE DRAWINGS

In a detailed description of a preferred embodiment of the invention presented below, reference is made to the accompanying drawings, in which:

FIG. 1 is a diagrammatic view of a photoconductively controlled shutter, in which a photosensor regulates an exposure interval in accordance with light intensity;

FIG. 2 is a diagrammatic view of a diaphragm and a mechanism for positioning an IR-attenuating filter into and out of a light path to the photosensor of FIG. 1, and shows the position of the filter for an ambient exposure;

FIG. 2a is a view taken along the line 2a—2a of FIG. 2 and shows a cam, which is responsive to a release button for actuating the shutter of FIG. 1;

FIG. 3 illustrates the position of the diaphragm and the filter of FIG. 2 for a flash exposure in dim light;

FIG. 4 illustrates the position of the diaphragm and the filter of FIG. 2 for a flash exposure in bright light, i.e. fill-flash exposure;

FIG. 5 is a diagrammatic view of a camera flash-sensing member showing the flash-sensing member when no photographic flash device is mounted on the camera; and FIG. 6 shows the flash-sensing member of FIG. 5 when a flash device is mounted on the camera.

DETAILED DESCRIPTION OF A PREFERRED EMBODIMENT

Because photographic cameras are well known, the present description will be directed in particular to elements forming part of, or cooperating more directly with, apparatus in accordance with the present invention. It is to be understood that camera elements not specifically shown or described may take various forms well known to those having skill in the art. Furthermore, although the invention is described in connection with controlling a chemical flash exposure, it is also applicable to controlling an electronic strobe flash exposure.

FIG. 1 shows a photoconductively controlled shutter, denoted generally 10, for regulating an exposure interval as a function of light intensity. The shutter 10 comprises blades 12 and 13, which are biased by springs 14 and 16, respectively, to uncover and cover an aperture 18 through which light passes to expose photographic film (not shown).

A pivotally mounted latch 20 latches the blade 12 in a cocked, aperture-covering position. A spring 20a biases the latch 20 into its latching position. A shutter release button 22 is mounted above the latch 20, as viewed in the drawing, for downward movement in response to actuation by a camera operator. A spring biased triangular-shaped cam 22a is operatively coupled to the button 22, as is shown diagrammatically, for movement therewith.

When a camera operator first depresses the button 22, the cam 22a in response thereto moves from left to right, as viewed in FIGS. 1 and 2a. This movement occurs before the shutter 10 opens, for a reason made apparent hereinbelow. When the operator depresses the button 22 its full extent, the latch 20 pivots about a pin 23 in a clockwise direction to release the blade 12. As the latch 20 releases the blade 12, the spring 14 drives the blade 12 in a counterclockwise direction, thereby initiating an exposure, to a position engaging a stop 29. In this position, the blade 12 uncovers the camera exposure aperture.

A pivotally mounted armature 24, coupled to an electromagnet 26, normally retains the blade 13 in an aperture uncovering position to the left of the aperture 18. A drive spring 28 is arranged to pivot the armture 24 about a pin 27 in a counterclockwise direction 28. When this pivoting movement occurs, the spring 16 drives the shutter blade 13 in a counterclockwise direction to a position engaging the shutter blade 12. In this position, the blade 13 covers the aperture 18, and thereby terminates the exposure.

An electronic circuit 30 includes an IR-sensitive photosensor 31 arranged to be exposed to light. The circuit 30 regulates the state of the elecromagnet 26 in relation to the intensity of visible light and IR impinging upon the photosensor 31. When an exposure commences, the circuit 30 has energized the electromagnet 26 which magnetically latches the armature 24. While the armature 24 is latched, the shutter blade 13 is retained in its aperture uncovering position.

A switch $S_1$ short circuits a timing capacitor 34 prior to the time that an exposure commences. When the switch $S_1$ is open, current through the photosensor 31 charges the timing capacitor 34 at a rate proportional to the magnitude of the current. The current is proportional to the intensity of visible light and IR impinging upon the photosensor 31. If the photosensor 31 is exposed to bright visible light and intense IR, the capacitor 34 charges at a rapid rate. If the photosensor 31 is exposed to less intense visible light and IR, the cpacitor 34 charges at a correspondingly lower rate.

The switch $S_1$ is opened when the blade 12 moves from its latched position so that the charging of the capacitor 34 is synchronized with the opening of the shutter 10. When the capacitor 34 is charged to a predetermined voltage, which represents a desired exposure, an exposure terminating signal is produced. The electromagnet 26 is de-energized in response to this signal. The armature 24 is no longer magnetically latched, and the spring 28 urges the armature in the counterclockwise direction. When this occurs, the spring 16 drives the shutter blade 13 into its aperture-covering position, thereby terminating the exposure.

FIG. 2 shows a spring-biased diaphragm lever 36, having an aperture 36a at one end and a neutral density filter 39 attached to the other end. The lever 36 is mounted for pivotal movement about a pivot 37 between a first position, shown by the solid lines, and an actuated position, shown by the dashed lines, adjacent a stop 38. When the lever 36 is in its actuated position, the aperture 36a is aligned with the aperture 18, and the filter 39 covers the photosensor 31. In that position, the size of the camera's exposure aperture is decreased to the size of the aperture 36a. The filter 39 attenuates light impinging upon the photosensor 31 the equivalent of the reduction of the camera exposure aperture by the aperture 36a, so that the photosensor 31 senses light in proportion to the appropriate exposure aperture size.

A diaphragm setting mechanism 40 controls the diaphragm lever 36 so that the size of the camera's exposure aperture can be varied as a function of the prevailing light intensity. In dim ambient light, the larger of the two exposure apertures (aperture 18) is used, and in bright ambient light the smaller exposure aperture (aperture 36a) is used. The diaphragm setting mechanism 40 can be constituted by an arrangement in which the diaphragm lever 36 is adjusted manually by a camera operator, or preferably the mechanism 40 is constituted by an arrangement in which the lever 36 is set automatically in accordance with the intensity of light impinging upon the photosensor 31. U.S. Pat. No. 4,059,836 describes an arrangement for setting a diaphragm automatically into either of two positions as a function of light intensity.

Referring now to FIGS. 5 and 6, a pivotally mounted lever 42 has a flash-sensing finger 44 attached at one end of the lever and a stop member 46 attached at the other end. A spring 47 urges the lever 42 in a clockwise direction, as viewed in FIGS. 5 and 6, towards the bottom of a socket 48, which is adapted to receive a photographic flashbulb. When the flashbulb is absent from the socket 48 (FIG. 5), the spring 47 urges the lever 42 against the bottom of the socket so that the flash-sensing finger 44 extends into the socket. In this position, the stop member 46 is positioned as shown in FIG. 2.

When a flashbulb 48a is mounted in the socket 48 (FIG. 6), the base of the flashbulb moves the flash-sensing finger 44 downwardly thereby causing the lever 42 to pivot in the counterclockwise direction about a pin 49 against the influence of the spring 47. In this position, the stop member 46 is moved to the right, as shown in FIGS. 3 and 4, for a reason made apparent hereinbelow.

Referring again to FIG. 2, a mechanism, denoted generally 50, is arranged to selectively control IR impinging upon the photosensor 31 in accordance with (1) whether or not a flash exposure is to be made, and (2) the size of the camera exposure aperture. The mechanism 50 includes a filter carrier 52 on which an IR-attenuating filter 54 is mounted. The filter 54 serves to effectively block electromagnetic wavelengths in a band lying between the extreme of the visible light, approximately 700 nonometers, out to the extreme of the band to which the photosensor 31 is sensitive. The latter can be approximately 1100 nanometers for a silicon photosensor.

The filter 54 has an A section and a B section, which are spaced apart, as shown. A spring 60 biases the carrier 52 about an axis 59 in the counterclockwise direction, through first, second and third positions relative to a light path to the photosensor 31. In the first position, filter section A covers the photosensor 31. In the second position, shown in FIG. 3, neither section A nor section B covers the photosensor 31, and in the third position, shown in FIG. 4, filter section B covers the photosensor 31.

The carrier 52 has three detents 65, 66 and 67, as shown. The detent 65 normally abuttingly engages the lower surface 68a of the cam 22a, which blocks the carrier 52 in its first position. When the camera operator initially depresses the button 22 prior to an exposure, the cam 22a moves in response thereto so that its surface 68a no longer engages the detent 65 (FIG. 2a).

The latch 20 under the influence of its bias spring 20a returns the button 22 to its normal "UP" position from its fully depressed position. The spring 69 causes the cam 22a to follow the button 22 during its return movement. As the button 22 returns to its "UP" position, the surface 68 of the cam 22a urges the detent 65 in the clockwise direction, thereby returning the carrier 52 to its first position.

When a flashbulb is absent from the socket (FIG. 5), the spring 47 positions the lever 42 so that the stop member 46 abuttingly engages the detent 66 (FIG. 2). The spring 47 exerts a stronger force on the lever 42 than the spring 60 exerts on the carrier 52. Because of the relative forces applied by the springs 47 and 60, the member 46 prevents the carrier 52 from pivoting from its first position whenever a flashbulb is absent from the socket 48.

When a flashbulb 48a is mounted in the socket 48 (FIG. 6), the stop member 46 is positioned as shown in FIGS. 3 and 4 and no longer blocks the carrier 52 in its first position. Therefore, when the cam 22a is moved in response to actuation of the shutter release button 22, the spring 60 can pivot the carrier 52 from its first position.

When the diaphragm lever 36 is positioned for an exposure in dim ambient light, shown by the solid lines of FIGS. 2 and 3, a stop 76 mounted on the lever 36 perpendicular to its surface 77 is positioned in the path of the nose of the detent 67. When the spring 60 pivots the carrier 52, the nose of the detent 67 abuttingly engages the stop 76, and the carrier is blocked in its second position (FIG. 3).

When the diaphragm lever 36 is positioned for an exposure in bright light (FIG. 4), the stop 76 is located out of the path of the detent 75. In this position, the spring 60 can drive the carrier 52 past its second position into its third position.

The operation of the camera is described for four picture-taking situations. These situations depend upon whether the ambient light is bright or dim, and whether or not a flashbulb is used.

| Situation No. 1 | |
|---|---|
| Ambient | bright |
| Flashbulb | not used |

This corresponds to an ambient exposure outdoors, where IR can be intense. When a flashbulb is not used, the carrier 52 is retained in its first position (FIG. 2), because the stop member 46 of the lever 42 engages detent 66. Section A of the filter 54 effectively blocks IR from the photosensor 31, thereby preventing the prevailing IR from influencing the control of the exposure.

| Situation No. 2 | |
|---|---|
| Ambient | dim |
| Flashbulb | used |

A flash exposure made in dim light normally occurs indoors where IR is less intense than outdoors. In this situation, the photosensor 31 is subjected to IR to advance the time at which closing of the shutter 10 occurs.

For a flash exposure in dim ambient light, an operator sets the camera as shown in FIG. 3. The flashbulb 48a causes the stop member 46 of the lever 42 to move to the right out of the immediate path of the detent 66 of the carrier 52. Because the ambient light is dim, the diaphragm lever 36 is positioned so that the larger of the two exposure apertures, aperture 18, is used. In that position, the stop 76 is in the path of the nose of the detent 67.

When the shutter button 22 is initially depressed, the cam 22a is urged downwardly, as viewed in FIG. 2, and the spring 60 pivots the carrier 52 in the counterclockwise direction from its first position. The detent 67 engages the stop 76, thereby blocking the carrier 52 in its second position, wherein the filter 54 does not cover the photosensor 31.

When the operator depresses the button 22 fully, the shutter 10 opens. IR, including IR produced by the flashbulb 48a, impinges upon the photosensor 31 and thereby contributes to the control of the exposure.

If the scene is generally dark, the IR impinging upon the photosensor 31, in addition to the visible light, is enough to advance closing of the shutter 10 so that overexposure of light scene areas, such as light flesh tones, does not occur. If the scene is generally light, the refelected visible light dominates the IR reaching the photosensor 31 so that shutter closing is not advanced significantly. Accordingly, an underexposure does not occur.

| Situation No. 3 | |
|---|---|
| Ambient | bright |
| Flashbulb | used |

This situation most probably occurs outdoors when a fill-flash exposure is made to soften dark shadows caused by bright sunlight.

For a fill-flash exposure, the camera is set as shown in FIG. 4. The stop member 46 of the lever 42, in response to the flashbulb 48a, is moved to the right. Because the sunlight is bright, the diaphragm lever 36 is positioned so that an exposure is made with the small exposure aperture 36a. In this position, the stop 76 of the lever 36 is outside the path of the detent 67.

In response to initial actuation of the shutter release button 22, the spring 60 pivots the carrier 52 from its first position (FIG. 2) to its third position (FIG. 4) wherein filter section B of the filter 54 is aligned with the light path to the photosensor 31. Therefore, IR reflected from the scene being photographed is blocked from the photosensor 31, and is thereby prevented from prematurely shortening the exposure interval.

| Situation No. 4 | |
|---|---|
| Ambient | dim |
| Flashbulb | not used |

This picture-taking situation most probably occurs outdoors when an exposure is made on a dull day. Even though the ambient visible light is low, the ambient IR is intense and can cause an underexposure if the scene includes grass and green foliage. It is therefore desirable to block IR from the photosensor 31.

As with Situation No. 1, when a flashbulb is not used, the stop member 46 is positioned, as shown in FIG. 2, engaging the detent 66, thereby blocking the carrier 52 in its first position. Section A of the filter 54 covers the photosensor 31 so that IR is effectively blocked from falling upon the photosensor.

The invention has been described in detail with reference to the Figures; however, it will be appreciated that variations and modifications are possible which are within the spirit and scope of the invention. For example, it can readily be understood by those skilled in the art that the filter 54 could consist of only one section, and the carrier 52 could have only two positions, one position being so that the IR-attenuating filter 54 covers the photosensor 31, and the second position being so that the filter uncovers the photosensor. Furthermore, the camera diaphragm could be constructed and arranged so that the size of the exposure aperture could be adjustable linearly as a function of the prevailing light intensity, and the filter 54 could be arranged so as to attenuate IR in progressively varying amounts in accordance with exposure aperture size.

What is claimed is:

1. In a camera having an exposure aperture, exposure-determining means, including a photoresponsive device, for controlling an exposure as a function of visible light and infrared radiation energizing said photoresponsive device, and socket means for receiving a source of artificial light, the improvement comprising:
    (a) an infrared-attenuating filter having first and second positions in which it respectively covers and uncovers said photoresponsive device;
    (b) diaphragm means for controlling the size of said exposure aperture and having at least first and second conditions for setting said exposure aperture size for exposure in bright and dim light, respectively;
    (c) means for sensing the presence and absence of a light source in said socket means; and
    (d) means controlled jointly by said sensing means and said diaphragm means for moving said filter from its first position to its second position only when a light source is present in said socket means and said exposure aperture is set for an exposure in dim light, whereby the duration of an exposure interval is influenced by infrared light during an exposure by artificial light only if the aperture size is adjusted for dim light.

2. In a camera having socket means for receiving a photographic flash device, exposure-determining means for controlling an exposure, and radiation-sensitive means, coupled to said exposure-determining means, arranged to be exposable to visible light and infrared for regulating an exposure in inverse proportion to the intensity of visible light and infrared energizing said radiation-sensitive means during the exposure, the improvement comprising:
    (a) diaphragm means for adjusting the size of an exposure aperture and having at least (1) a first condition for setting said exposure aperture size for an exposure in bright light, and (2) a second condition for setting said aperture size for an exposure in dim light;
    (b) filter means mounted for movement relative to said radiation-sensitive means between (1) a first position in which said filter means blocks infrared from impinging upon said radiation-sensitive means, and (2) a second position in which said filter means is located to enable infrared to energize said radiation-sensitive means;
    (c) a stop member, associated with said diaphragm means, having a disengaging position when said diaphragm means is in its first condition, and an engaging position when said diaphragm means is in its second condition;
    (d) means for sensing the presence and absence of a flash device in said socket means; and
    (e) filter moving means, controlled jointly by said sensing means and said stop member, for positioning said filter means in (1) its first position when either said stop member is in its disengaging position, or a flash device is absent from said socket means, and (2) its second position when said stop member is in its engaging position and a photographic flash device is present in said socket means, whereby an exposure is influenced by infrared during a flash exposure only when the exposure aperture size is adjusted for dim light.

3. In a camera having a photosensor responsive to visible light and infrared for regulating an exposure interval, and means for detachably receiving a photographic flash device, the improvement comprising:
- (a) an infrared-attentuating filter means mounted for movement along an operational path from a first photosensor-covering position through a photosensor-uncovering position into a second photosensor-covering position;
- (b) a flash device sensing lever, communicating with said receiving means, mounted for movement (1) within the operational path of said filter means when a photographic flash device is absent from said receiving means, and (2) out of the operational path when a flash device is mounted in said receiving means;
- (c) diaphragm means for adjusting the size of an exposure aperture and having at least first and second conditions for adjustably setting the exposure aperture size for exposure in bright and dim light, respectively;
- (d) a stop member, controlled by said diaphragm means, movable (1) within the operational path of said filter means when the exposure aperture size is adjusted for dim light, and (2) out of the operational path when the exposure aperture size is adjusted for bright light; and
- (e) means normally biasing said filter means for movement from its first photosensor-covering position into its photosensor-uncovering position, and from its photosensor-uncovering position into its second photosensor-covering position, said biasing means being controlled jointly by said sensing lever and said stop member such that said filter biasing means is prevented from moving said filter means from its first photosensor-covering position into its photosensor-uncovering position when said sensing lever is located in the operational path, and said filter biasing means is prevented from moving said filter means from its photosensor-uncovering position into its second photosensor-covering position when said stop member is located in the operational path.

4. In a camera having an exposure aperture, exposure-determining means, including a photoresponsive device, for controlling an exposure as a function of visible light and infrared radiation impinging upon said photoresponsive device, and flash means controllable for making an exposure either by ambient illumination or by flash illumination, the improvement comprising:
- (a) an infrared-attenuating filter having first and second positions in which it respectively covers and uncovers said photoresponsive device;
- (b) diaphragm means for controlling the size of the exposure aperture and having at least first and second conditions for setting the exposure aperture size in bright and dim light, respectively;
- (c) means for sensing whether or not said flash means is to be used for making an exposure; and
- (d) means controlled jointly by said sensing means and said diaphragm means for moving said filter from its first position to its second position only when said flash means is to be used and the exposure aperture is set for an exposure in dim light, whereby the duration of an exposure interval is influenced by infrared during an exposure by flash illumination only if the aperture size is adjusted for dim light.

5. In a camera having exposure-determining means, including a photoresponsive device, for controlling an exposure as a function of visible light and infrared radiation impinging upon said photoresponsive device, and flash means controllable for making an exposure either by ambient illumination or by flash illumination, the improvement comprising:
- (a) an infrared-attenuating filter for respectively covering and uncovering said photoresponsive device;
- (b) a mechanism having first and second conditions depending upon whether ambient light is bright or dim, respectively;
- (c) means for sensing whether or not said flash means is to be used for making an exposure; and
- (d) means controlled jointly by said sensing means and said mechanism for causing said infrared-attenuating filter to cover said photoresponsive device when flash illumination is to be used in bright ambient light, and for causing said infrared-attenuating filter to uncover said photoresponsive device when flash illumination is to be used in dim ambient light.

* * * * *